Patented May 5, 1942

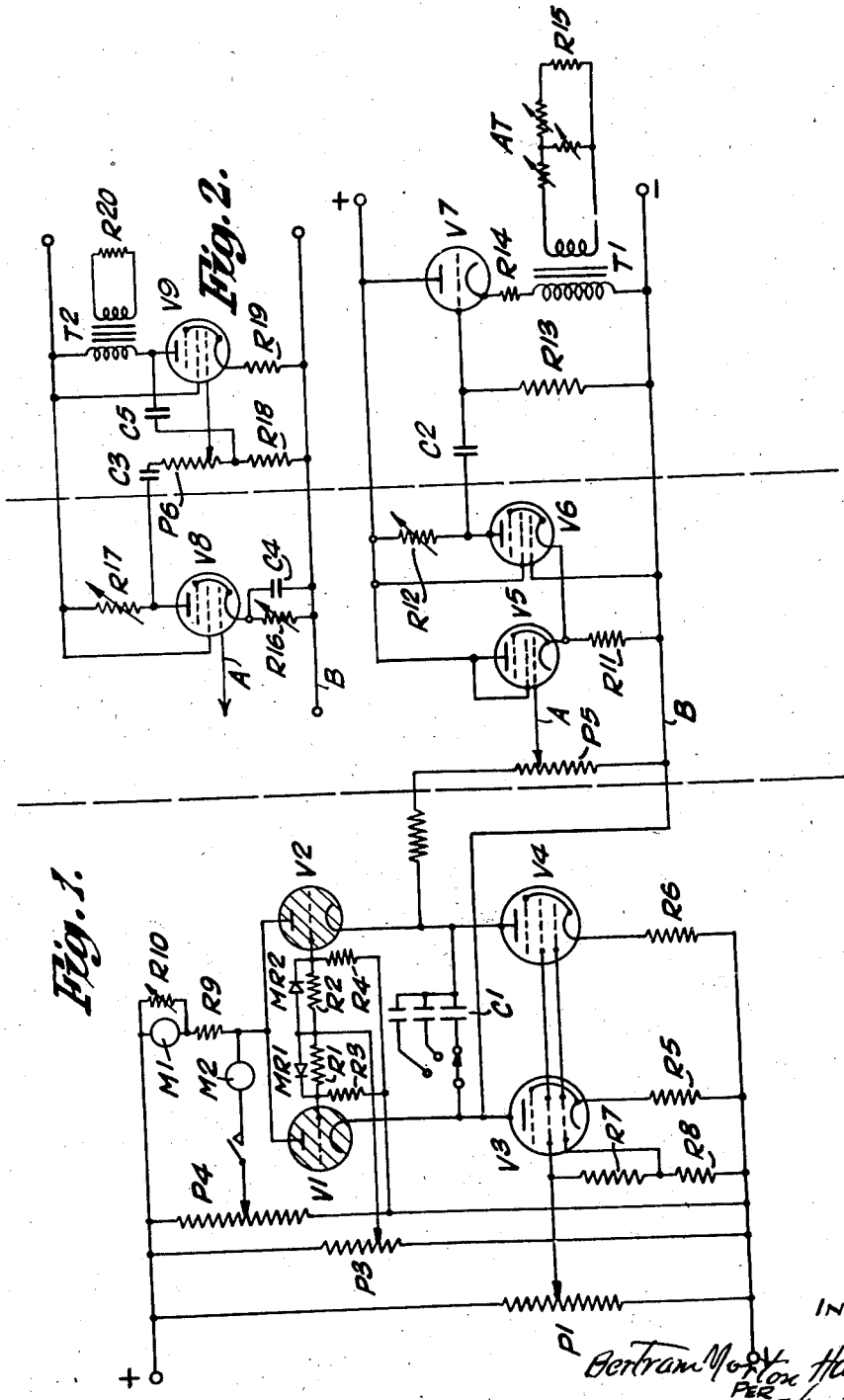

2,282,130

UNITED STATES PATENT OFFICE 2,282,130

THERMIONIC GENERATOR OF ALTERNATING CURRENT

Bertram Morton Hadfield, Harrow Weald, England, assignor to Associated Electric Laboratories Inc., Chicago, Ill., a corporation of Delaware Application May 13, 1940, Serial No. 335,018
In Great Britain May 2, 1939

5 Claims. (Cl. 250—36)

The present invention relates to alternating current or voltage generators and the main object of the invention is to provide a generator giving a current or voltage output of substantially constant value over a wide range of frequencies and with a small harmonic content without the use of components having a high standard of precision.

A further object of the invention is to provide an alternating current or voltage generator or oscillator in which an indication of the generated frequency is given by a direct current meter of known type instead of by the usual method of a calibrated scale or chart.

According to one feature of the invention the oscillator comprises a variable frequency triangular wave form generator in combination with a waveform correction circuit which converts the triangular wave form into an approximate sinusoidal wave form.

According to a further feature of the invention the output from the waveform correction circuit is applied to an output stage to provide a suitable power output which output stage is arranged to give negative feedback in order to facilitate the design of the output transformer and to make the output voltage less susceptible to changes in the load resistance.

According to a further feature of the invention the triangular waveform generator comprises a pair of thermionic valves having constant current characteristics and arranged to provide negative feedback by providing a resistance in the cathode lead of each valve and by applying a positive bias to the grid of each valve in order to compensate for the reduced anode current.

The variable frequency generator circuit consists of a modification of the well-known "time base" circuit, in which a condenser is periodically charged and discharged by a current of constant value, the periods of charge and discharge being equal in time and magnitude. In this manner the waveform of the curve connecting time with the voltage on the condenser will be triangular having sides of equal slope. Furthermore, for a given value of condenser and charging voltage and assuming the amplitude remains constant, the frequency of this alternating voltage will be proportional to the value of the constant charging current. The latter may therefore be used as an indication of the frequency by the use of an appropriate direct current meter. By arranging to vary the charging current and with the use of known values of condensers the generated frequency may be varied in any desired manner in accordance with the indication on the meter.

The function of the waveform correction circuit is to convert this "triangular" voltage waveform into an approximate sinusoidal form as this is the type of waveform most generally acceptable for experimental use, since it contains no frequency other than the fundamental. The degree of purity of a waveform is generally determined by its harmonic content, and values of some 5 to 10 percent are acceptable for work not involving a high degree of precision. The "triangular" waveform on the condenser is applied to a thermionic valve or valves whose input/output characteristic exhibits approximately equal and opposite curvatures about a point of inflection. Since the input is varying linearly with respect to time, the output waveform will be a reproduction of the characteristic of this stage and will be of approximate sinusoidal form, the input to the stage being of course biased to the point of inflection. It is found that a close approximation, sufficient for most normal requirements, can thus obtained.

Having now obtained the correct type of waveform in the form of an alternating voltage of relatively large amplitude, this is applied to the output stage which performs the function of supplying sufficient power into a given value of load resistance. Although the design of this stage follows well-known lines, it is preferred to use negative feedback of the output voltage to the grid of some 100 percent in value, in order to facilitate the design of the output transformer and to make the output voltage less susceptible to changes in the load resistance.

Reverting to the variable frequency generator circuit it is also proposed to incorporate means to alter the scale reading of the frequency indicating meter, such as the well-known universal shunt method, together with means for opposing the value of current at any required point so that small changes of frequency can be made and measured with greater accuracy.

The invention will be better understood from the following description taken in conjunction with the accompanying drawing comprising Figs. 1 and 2. In the drawing Fig. 1 shows the complete circuit of the oscillator comprising the triangular waveform generator stage, the waveform correction stage and the output stage, while Fig. 2 shows an alternate waveform correction stage and output stage.

The triangular waveform generator circuit comprises of two gas-filled valves V1 and V2 of the grid controlled vapour discharge type and two pentode valves V3 and V4 connected in the following manner. The anodes of the gas-filled valves V1 and V2, are joined together and connected via a resistance R9 and direct current meter M1 to the positive busbar of the power supply. The cathodes of V1 and V2 are joined to the anodes of two pentode valves V3 and V4 as shown. The condenser C1 is joined to these two connections, i. e., between the cathodes of V1 and V2. The screens of V3 and V4 are joined together and to the tap on a potentiometer P1 connected across the positive and negative busbars. The control grids of V3 and V4 are joined together and to the negative busbar. The cathodes of V3 and V4 are connected over resistances R5 and R6 to the negative busbar. The grids of V1 and V2 are joined by two resistances R1 and R2 to prevent the flow of excessive grid current which resistances are shunted by two metal rectifiers MR1 and MR2 respectively, the positive poles of which are connected to the grids of the valves. The point between the two resistances is connected to the tap on a potentiometer P3 connected across the supply busbars. Further the grids are connected over high resistances R3 and R4 to the negative busbar.

On connecting the power supply to the busbars one of the gas-filled valves V1 or V2 will pass current, owing to slight differences in their characteristics. The anodes of V3 and V4 will immediately be raised in potential to a value just less than the positive busbar by the potential drop on V1 or V2 (i. e., about 15 volts). The currents passing through V3 and V4 will tend to be constant, owing to the characteristics of such valves, and of a value determined by the screen potentials. The current through V4 (assuming that V1 is conducting) charges C1 at a uniform rate, thus causing the anode potential of V4 to fall until it attains a value slightly above that of the grid of V2. At this value, and since the cathode of V2 is connected to the anode of V4, V2 commences to pass current. This raises the anode potential of V4 to that of the busbar less some 15 voltages, whilst the anode of V3 is raised to a higher potential, owing to the charge on C1, causing a cessation of current flow through V1. The condenser C1 is now being charged in the reverse direction via V2 and V3 at a nominally constant current determined by the screen potential of V3. As before, when the anode of V3 has fallen to a value slightly above that of the grid of V1 the latter will commence to conduct again and the process of charging C1 in the original direction will be resumed. This action will continue indefinitely resulting in an alternating voltage waveform on C1 of "triangular" shape.

As pointed out above, the charging currents in either direction should be equal and constant in value. This is achieved by employing negative feedback of the current type by means of suitable cathode resistances R5 and R6. By choosing the resistances R5 and R6 having regard to the mutual conductance of the valves, the dynamic anode resistance is made very high and the anode currents are made equal so that any valve of a given type and within commercial limits of ±30% can be used. This arrangement reduces the value of the charging current but the normal values can be realised by placing a positive bias on the control grids with respect to the negative busbar. In the embodiment this bias is obtained from the potentiometer R7—R8 connected to the screen grid in order to retain the range of current control normally obtained by variation of the screen grid potential. The equalisation of anode currents may be carried out in other ways. For instance an adjustable potentiometer may be connected between the cathodes of V3 and V4 and the tapping point connected to the negative busbar or a high resistance potentiometer may be connected between the grids of V3 and V4 with the tap taken to the negative busbar. The method shown in the drawing is however to be preferred since the charging current is rendered more constant over a wide range of screen potential and is less dependent on the condition of the valve. In a similar manner the biases due to grid current may be thus adjusted to give equality of anode currents. This latter method is not preferred owing to the absence of any negative feedback effect to enhance the constant current characteristics of the pentode valves.

The frequency of the alternating voltage generated on C1 is proportional to the charging current and inversely proportional to the amplitude of the alternations and the capacity of C1. It is proposed to use condensers of fixed value each covering a certain band of frequencies. Intermediate frequencies will be obtained by variation of the screen potential of V3 and V4. A fine control of the generated frequency may also be obtained by connecting a variable resistance of appropriate value between the tap on potentiometer P2 and the negative busbar. Alteration of this resistance will alter the biases on V3 and V4 simultaneously and to the same degree, thus altering the charging currents by substantially the same amounts.

It will be noticed that the generated frequency for a given capacity is proportional to the charging current and inversely proportional to the amplitude of the alternations. The charging current is almost proportional to the screen voltage, which at any given setting is dependent on the busbar voltage. The amplitude is also almost proportional to the grid potential of V1 and V2 as determined by the setting on P3; that is, it is also dependent on the busbar voltage. Hence the generated frequency will be relatively unaffected by changes in the supply voltage.

Variation of the striking voltage of the valves V1 and V2 may be effected by the potentiometer P3 in conjunction only with the grid resistances R1 and R2. With this method, however, it has been found that R1 and R2 cannot be reduced below some 1 megohm, in order to improve the high frequency response of the grid circuits, because the resistance of the grid/cathode path of the valve passing current may become of comparable magnitude at low currents. When the latter occurs, a large grid/cathode bias appears from the potential on P3 via the conducting path of the anode/cathode, and a tendency for superposed H. F. oscillation occurs.

As R1 and R2 must be kept reasonably high for this reason, it is obvious that the H. F. response of the non-conducting valve's grid circuit will be poor, owing to the electrode capacity. The amplitude of alternations on C1 will therefore tend to diminish with frequency. The effect of the electrode capacity may be considered as follows. When V1 is passing current both grid and cathode are raised to a potential some 15 volts below the positive busbar. When V1 ceases to pass current the grid potential tends to remain at this value but in fact discharges via R1 down to the potential of the tap on P3. The form of the discharge curve is that due to a voltage equal to the difference between the tap on P3 and 15 volts less than the positive busbar, discharging from the electrode capacity through R1. It will be readily seen that unless complete discharge takes place so that the grid has attained the potential of the tap on P3 before the completion of the charge on C1, the latter will occur at a lower voltage, thus reducing the amplitude on C1.

By connecting a rectifier MR1 across R1 with the positive on the grid, and connecting the latter to the negative busbar via R3 of some 5 megohms, the grid now tends to discharge down to the negative busbar. The presence of the rectifier however, prevents the potential of the grid from falling lower than that of the tap on P3, since this would infer that the grid is negative with respect to the tap. Thus the grid is discharged over the initial part of the curve where the slope is a maximum, and therefore in a much shorter time than before. A similar connection of a rectifier MR2 is made across resistance R2 while the grid of the valve V2 is connected to the negative busbar over a high resistance R4.

By these means the operation of the gas-filled valves can be maintained so that a frequency range of 10 to 20,000 cycles is obtained without alteration of the alternating amplitude on C1.

As has been mentioned formerly, it is proposed to read the frequency directly from the value of the charging current as indicated on a direct current meter M1. It will be necessary to calibrate the generator by means of a known frequency, by means of "beats" or other well known methods. The frequency of the triangular waveform on C1 is given by the expression $$\frac{I}{C.V}$$

where I is the constant charging current in amperes, C is the capacity of C1 in farads, and V is the total amplitude on C in volts. For given values of C and V the frequency is proportional to I. The current measured by a D. C. meter such as M1 will be 2.1 flowing through either V1 or V1 to V3 and V4, and if the generated frequency is calibrated against say, the mains supply, by alteration of P3 and the reading on M1 made to correspond by adjustment of the variable shunt R10, other frequencies obtained by alteration of P1 can be read directly.

One of the advantages of this form of generator is that the frequency at any given value can be varied and read to as fine a degree as required. Variations of the frequency are controlled by P1 which can be arranged in steps with any required degree of control in between the steps. To read small alterations in frequency a second meter such as M2 can be used, arranged in a bridge circuit consisting of R9 and P4 so that at the nominal frequency zero deflection is obtained. This meter can be of the centre zero type and will then read differences of frequency from the nominal, to any degree of accuracy.

The alternating voltage on condenser C1 is applied over a suitable potentiometer P5 to the grid/cathode circuit of a valve or valves forming the next stage of the oscillator in order to convert the "triangular" waveform into an approximate sinusoidal waveform. One form of waveform correction circuit comprises the valves V5 and V6 and the principle upon which this circuit operates will now be explained.

It can be shown that the triangular alternating waveform having sides of uniform and equal slope, such as is obtained from C1, can be represented as a Fourier series in which only odd harmonic functions appear, and the amplitudes of these harmonics is related to the fundamental by the inverse of the square of the order of the harmonic. Thus for instance, the third harmonic has an amplitude of one-ninth, the fifth an amplitude of one twenty-fifth, etc., of the fundamental. If this function be integrated the amplitudes of the harmonic will be related to the fundamental by the inverse of the cube of the order of the harmonic, and the resulting waveform consists of a series of parabolae. Such integration could be performed by passing the triangular waveform current through a condenser, but the voltage amplitude will decrease with increase of frequency. However, if the waveform could be converted into a series of parabolae the resulting wave form will only contain odd harmonics of values one twenty-seventh for the third, 1/125 for the fifth, etc. On a percentage basis this would amount to 3.7% third, 0.8% fifth, etc., and it is considered that such values would be acceptable in practice.

In order to convert each half wave of the triangular waveform on C1 into a parabola, the waveform is applied over a potentiometer P5 to the grid of the valve V5 which has a large cathode resistance R11. By suitable adjustment of the input level the negative half waves are made parabolic by curvature of the grid volts/anode current characteristic, whilst the positive half waves remain unaltered. This waveform on R11 is then applied to V6 in such a manner as to produce the same effect on the remaining half waves, so that the required series of parabolae is available on R12. Valves V5 and V6 are preferably of the same type and of pentode construction, so that the grid volts/anode current characteristic is unaffected by anode resistance, and in addition the output can be adjusted by alteration of R12.

It will be seen that this type of corrector stage enables the waveform to be corrected to a close approximation to a sine wave without affecting the constancy of output at all frequencies, and by alteration of P5 the amount of correction can be varied from nil to the required amount.

Referring now to the output stage, the design of this stage is conventional, except that the maximum amount of negative feedback of the voltage type is used in order to facilitate the design of the output transformer.

The alternating voltage on R12 is fed to the grid of V7 via the resistance/capacity coupling C2 and R13. The output transformer T1 has its primary winding and a resistance R14 connected in the cathode lead, so that maximum negative feedback of the voltage type is obtained. The normal cathode bias resistance R14, may with advantage be made the designed primary resistance of T1. The ratio of T1 is designed so as to match the output resistance R15 to the working internal impedance of V7 so as to obtain the maximum output power over the desired frequency range.

Alteration of the output level can be arranged by a grid tap on R13, but in order to obtain the maximum signal to noise ratio it is preferred to use a variable attenuator such as AT.

The waveform correction circuit shown in Fig. 2 operates on a somewhat different principle from that shown in Fig. 1. It is well-known that the grid volts/anode current characteristic of a thermionic valve exhibits marked curvature at the higher values of grid bias, more especially at low anode voltages. At lower values of grid bias the curvature is less pronounced and this portion is generally used for the purpose of amplification. However, by using a pentode valve with a higher value of anode resistance than is usual, the above characteristic can be caused to have curvature in the opposite sense at the lower values of grid bias.

The waveform corrector stage shown in Fig. 2 therefore consist of a pentode valve V8 with variable anode and cathode resistances R17 and R16 respectively, the former being adjusted to give a curvature to the input characteristic approximately equal and opposite to the normal curvature at high values of grid bias, whilst the latter is adjusted so that the working grid bias occurs at the point of inflection on this characteristic. Although it is not essential since the variations of anode current about the working or static value will be equal and opposite the cathode resistance R16 may be by-passed by a condenser C4 to eliminate negative feedback. In order to obtain more perfect equalisation of the opposite curvatures two valves working in pushpull manner can be used with advantage, the anode resistances being adjusted as before whilst the cathode resistances may, if required, be combined in a single resistance.

Although the above described method of producing the requisite curvature at lower values of grid bias is preferred, an alternative method is to use the effects of grid current. By means of appropriate values of grid resistance, the excursions of the input voltage into the grid current region produce progressively less changes in anode current, thus causing the necessary amount of curvature at lower values of grid bias. This method is not preferred owing to the loading effect on the input and because the input voltage at which the curvature begins is fixed by the grid current characteristic.

The alternating voltage available on the anode resistance of the corrector stage will be of considerable amplitude (owing to the use of a high anode resistance), and of approximate sinusoidal form. It is applied to the grid circuit of the output stage which is of conventional type and is intended to provide sufficient alternating power into the working load resistance. Since the latter is generally of much lower value than the optimum valve load and complete isolation as regards direct current potentials between the two is also generally required, an output transformer is used. As is well-known, the design of this transformer for operation over a wide band of frequencies presents considerable difficulties, if losses at low and high frequencies due to the inductance and self capacity of the windings are to be minimised. In order to make the use of a cheaper design of transformer possible, it is therefore proposed to employ the minimum amount of negative feedback, of the voltage variety, to the grid circuit. In the present case, this can be done without great trouble since the input voltage available is much greater than would normally be required to operate this stage.

The alternating voltage from the corrector stage is therefore applied to the grid of the output valve V9, over a coupling condenser C3 giving negligible loss at the lowest operation frequency, and a high resistance potentiometer P6 and a high resistance R18 connected in series between the grid and negative busbar. The potentiometer P6 is provided for the purpose of altering the output level. The cathode of the output valve is connected to the negative busbar via a self bias resistance R19, which may be by-passed if required. The anode of the valve may be connected to the positive busbar via the primary winding of the output transformer T2, and also to a condenser C5 whose remaining terminal is connected to the junction of the two grid resistances. The resistance P6 therefore acts as the normal coupling resistance between this stage and the preceding one, whilst the other R18 acts as the coupling resistance for the negative feedback. Apart from the loss on the coupling condenser C4, the alternating voltage on the resistance R18 is of the same magnitude and phase as that on the anode of the valve, and accordingly opposes that on the grid due to the input. The feedback is therefore the maximum possible, and of such nature as to reduce considerably the internal impedance of the valve. In virtue of this fact, the aforementioned losses due to the design of the transformer are greatly minimised, as are also changes of output level due to changes of terminating resistance.

As is well-known, when a large percentage of negative feedback is employed care must be taken that a change of phase does not occur in the feedback path at some frequency sufficient to convert the feedback into a positive function, and so cause self oscillation. In the present case such a condition is possible at either a very low frequency or a very high one, and in the former case can be overcome by using a somewhat lower time constant for the condenser/resistance feedback path than would be normally used. The latter case (i. e., self oscillation at a very high frequency) can be prevented by well-known methods, such as series grid and anode "stopper" resistances together with a small shunt condenser on the primary of the output transformer. In practice, no difficulty has been experienced in operating the type of output stage described over the normal audio frequency oscillator range of 20 to 20,000 cycles by using three condensers C1 of 0.5, 0.05 and 0.005 microfarad and covering a range of 10:1 in frequency on each condenser by adjustment of P1 with an overlap of 20% at the upper end of each range.

The waveform corrector stage shown in Fig. 2 is not however as satisfactory as that shown in Fig. 1 on account of poorer low frequency stability. It will be noted that two independent high tension supplies are needed but this can easily be arranged if the mains supply is used, since the currents required are of the order of 20 ma. at 150 volts.

The type of oscillator described may be adjusted so as to give an output waveform more suitable for the instantaneous delineation of the input/output characteristics of devices such as thermionic valves, by reducing the amplitude of the alternations applied to the corrector stage. The output waveform will then be of the "triangular" shape before described, and since the rate of change of the output is uniform in both directions of change, the output of the apparatus under test may be shown compared with the input by the use of a cathode ray oscillograph. Owing to the linearity of the input an image of uniform brightness is obtained without confusing secondary images. The latter are frequently obtained when the input is obtained from a time-base voltage in which the return stroke is of much higher frequency.

The output frequency of the circuit may be varied cyclically over any given band without any difficulty. Since the control of frequency is a linear function of the screen or grid voltages on V3 and V4, if an ordinary linear time-base is injected into either of these grids (preferably the latter on account of the smaller power required) the frequency will vary in sympathy and linearly. Hence the frequency characteristic of any device can be shown on a cathode ray oscillograph by using the time base to modulate the oscillator in this manner.

I claim:

1. A thermionic valve oscillator controlled by constant current to produce an alternating current of triangular wave form with sides of equal slope comprising a pair of gas filled tubes and a pair of vacuum tubes, connections from the cathodes of said first pair of tubes to the anodes of said second pair, means for causing the gas filled tubes to be alternately conducting including a condenser connected between said anodes, the grids of said gas tubes connected together through a resistance, and a rectifier in shunt of said resistance.

2. An oscillator as claimed in claim 1 having a direct current meter in the plate circuit of said gas filled tubes to provide an indication of the frequency of the generated alternating current.

3. The combination of an oscillator as claimed in claim 1 with a waveform correction means including a valve through which the current produced by the oscillator is fed and which is effective to transform all positive half waves of said current into waves of sinusoidal form, and another valve connected to the output of said last valve and transforming all negative half waves of current into half waves of sinusoidal form.

4. An oscillator comprising a pair of gas filled tubes having their grids connected together through a pair of resistances, a rectifier in shunt to each resistance a potentiometer supplying potential to the mid point of said resistances, a pair of vacuum tubes having their plates connected to the cathodes of said gas tubes and a condenser connected between the plates thereof, said condenser and connections causing alternate operation of said gas tubes to produce an alternating current of triangular wave form with sides of equal slope.

5. An oscillator such as claimed in claim 4 having a wave form connection circuit connected to the output thereof comprising a pair of valves each transforming part of the half waves of said alternating current into sinusoidal waves.

BERTRAM MORTON HADFIELD.